United States Patent [19]

Kubota

[11] 4,255,771
[45] Mar. 10, 1981

[54] VIDEO SIGNAL REPRODUCING APPARATUS

[75] Inventor: Yukio Kubota, Tokyo, Japan

[73] Assignee: Sony Corporation, Tokyo, Japan

[21] Appl. No.: 38,821

[22] Filed: May 14, 1979

[30] Foreign Application Priority Data

May 15, 1978 [JP] Japan .................................. 53-57307

[51] Int. Cl.³ ...................... G11B 21/10; G11B 21/18; G11B 5/58
[52] U.S. Cl. ........................................ 360/77; 360/70; 360/107
[58] Field of Search ...................... 360/77, 70, 10, 75, 360/105, 107, 109, 84

[56] References Cited

U.S. PATENT DOCUMENTS

| 4,143,405 | 3/1979 | Kubota | 360/10 |
| 4,148,082 | 4/1979 | Okada | 360/77 |
| 4,163,993 | 8/1979 | Ravizza | 360/10 |
| 4,165,521 | 8/1979 | Watanabe | 360/10 |

Primary Examiner—Alfred H. Eddleman
Attorney, Agent, or Firm—Lewis H. Eslinger; Alvin Sinderbrand

[57] ABSTRACT

A control system for a helical scan video tape recorder having two scanning heads each of which employs a bimorph plate to dynamically control the tracking path of its respective head chip, produces separate dynamic control signals for each of its two heads by "wobbling" or "dithering" the heads with respect to their scanning paths and employing resulting amplitude variations in the reproduced signals to drive the mean paths of the head chips into coincidence with the recorded tracks being scanned. A transfer circuit transfers a portion of an offset voltage, representing a final control signal existing at the end of scanning of a recorded track by one of the heads to the control system controlling the other head. This tends to bias the second head in the same direction in which the first head is biased in order to avoid the two heads scanning different tracks during still or slow motion reproduction.

7 Claims, 12 Drawing Figures

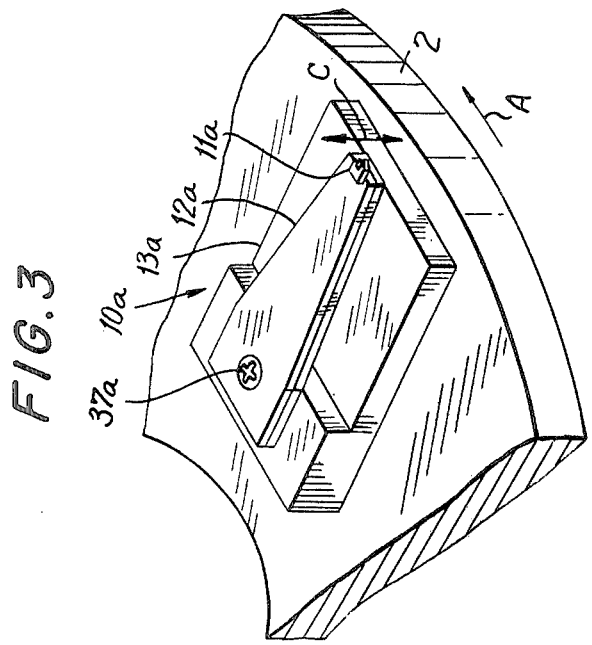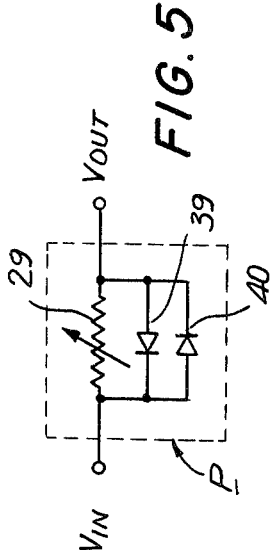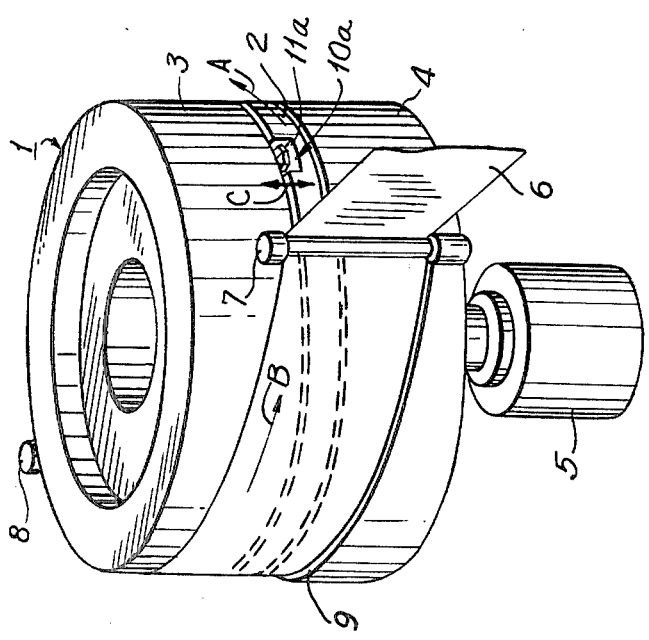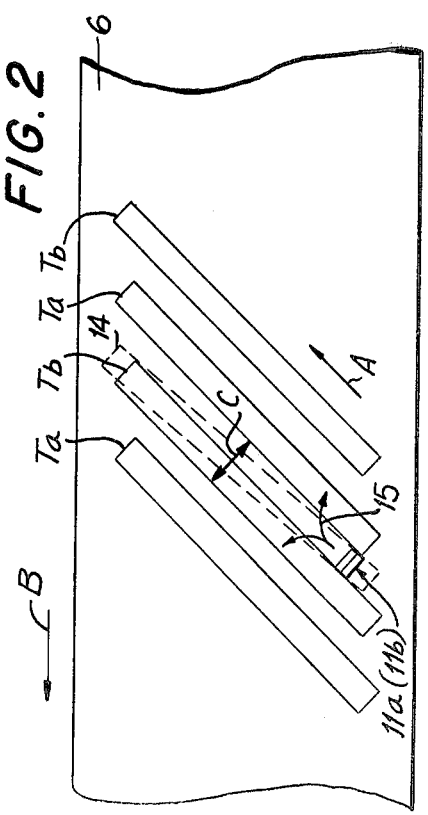

VIDEO SIGNAL REPRODUCING APPARATUS

BACKGROUND OF THE INVENTION

This invention relates to control systems for video tape recorders and, more specifically, to control systems which, during reproduction, control the across track positions of reproducing magnetic heads, that is, the positions of the heads considered in the direction transverse to the tracks being scanned.

In a helical scan video tape recorder having first and second reproducing heads, means are customarily provided for controlling the across track positions of the first and second reproducing heads into alignment with parallel tracks previously recorded on a video tape.

During still reproduction of interlaced fields, it is desired that both reproducing heads scan the same one of the parallel recorded tracks in order that both reproduced interlaced fields originate in the same frame. If one of the reproducing heads scans one track and the other reproducing head scans a different track, (a phenomenon known as frame reproduction or pairing) two pictures are displayed in the same frame which may have a time difference alternating with every field and hence rendering the object indistinct. Furthermore, if the track scanned by one of the magnetic heads is from one scene and the track scanned by the other magnetic head is from a different scene, the interlaced display of the two completely different video pictures superimposed on each other makes it difficult or even impossible to recognize either of the pictures being displayed. During slow motion, such frame reproduction or pairing may invert the sequence of reproduced fields to blur the displayed picture.

Frame reproduction or pairing, as described in the preceding, comes about because, when a first of the two magnetic heads begins to scan the recorded medium, there is a probability that it will begin scanning at a position on the recording medium equidistant from a pair of adjacent recorded tracks. Although a control system is conventionally employed to coincide a magnetic head with a recorded track, in the special case of equidistant location of the magnetic head from two adjacent tracks, only probability determines in which direction the magnetic head will be deflected and thereby determines which one of the two adjacent tracks will be scanned by the first magnetic head. When the second magnetic head arrives in a location midway between the two recorded tracks, the track to which it will be deflected is also governed by probability. Consequently, there exists a probability that one of the heads will be controlled to coincide with one track and the other head will be controlled to coincide with an adjacent track, thus producing frame reproduction or pairing.

The probability of frame reproduction or pairing is increased by hysteresis in the control elements which are conventionally used to control the across track positions of the magnetic heads. These control elements are suitably bimorph plates which carry head chips at their outer ends and are deflectable by control signals applied thereto. A bimorph plate, when controlled by a control signal to deflect from a neutral or home position, does not return to the neutral or home position when the control signal is removed, but instead remains slightly bent or set in the deflection direction. It is possible that, upon turning off a video tape recorder, one of the bimorph plates may be set in one direction with respect to its neutral or home position and the other bimorph plate may be set in the opposite direction. Upon turning on the video tape recorder, and beginning to scan parallel recorded tracks, the chance is increased of one head being controlled to follow a different recorded track than that followed by the second head.

OBJECTS AND SUMMARY OF THE INVENTION

It is an object of the present invention to provide an automatic tracking device for a video tape recorder which avoids the drawbacks of the prior art.

It is a further object of the present invention to provide an automatic tracking device which is operative during still or slow motion reproduction to bias one of two magnetic heads in a direction which causes it to scan the same previously recorded track as is scanned by the other magnetic head.

According to an aspect of the present invention, an automatic tracking device is provided for an apparatus having first and second magnetic heads adapted to alternately scan mean paths along parallel recorded tracks on a magnetic recording medium comprising first and second positioning means associated respectively with the first and second magnetic heads for displacing the mean paths of the first and second magnetic heads into substantial coincidence with a single one of the parallel recorded tracks in response to a first and a second control signal, respectively, first and second control signal generating means for alternately generating the first and second control signals, means in the first control signal generating means for holding a level of the control signal existing at the end of scanning by the first magnetic head, and transfer means for transferring at least part of the level of the control signal existing at the end of scanning by the first magnetic head to the second control signal generating means which is thereupon operative to bias the second positioning means for displacing in a direction tending to coincide the mean path of the second magnetic head with the same track scanned by the first magnetic head.

The above, and other objects, features and advantages of the present invention, will become apparent from the following description read in conjunction with the accompanying drawings in which like reference numerals designate the same elements.

BRIEF DESCRIPTION OF THE DRAWINGS

FIG. 1 is a perspective schematic view of a rotary head assembly to which reference will be made in describing the present invention;

FIG. 2 is a section of magnetic tape having a plurality of skewed parallel recorded tracks and a head scanning path represented thereon to which reference will be made in explaining the operation of the present invention;

FIG. 3 is a section of a rotary disc of a video tape recorder showing an enlarged perspective view of a magnetic head to which reference will be made in explaining the present invention;

FIG. 5 is a schematic diagram of another transfer circuit appropriate for use in the control system of FIG. 4;

DETAILED DESCRIPTION OF THE PREFERRED EMBODIMENTS

Figure 4:
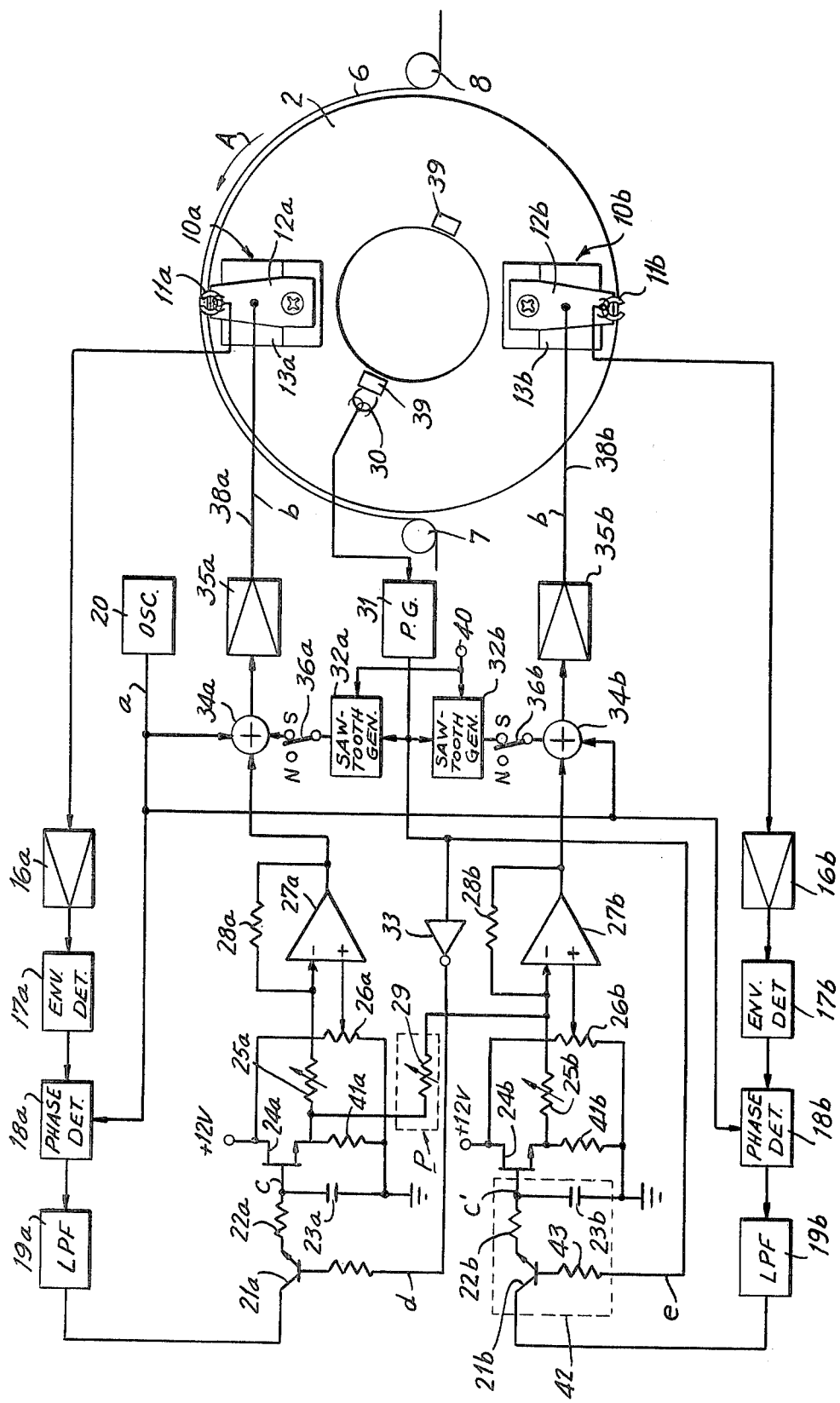
FIG. 4 is a schematic view of a rotary disc of a video tape recorder and a schematic diagram of a control system therefor according to an embodiment of the present invention.

Referring now to FIG. 1, there is shown a conventional rotary head assembly 1 for a helical scan video tape recorder having a rotary disc 2 which is rotated at a high rate, suitably 60 revolutions per second, by a drive means such as a motor 5. An upper drum 3 above rotary disc 2 and a lower drum 4 below rotary disc 2 provide a support surface for the transport of a magnetic tape 6 past rotary disc 2 in the transport direction shown by an arrow B. The wrap angle of magnetic tape 6 about rotary head assembly 1 is established by guide posts 7 and 8 and the tape is further guided in a slanting path by a stepped portion 9 in lower drum 4. In the illustrated embodiment, the wrap angle is established at about 180 degrees by guide posts 7 and 8.

Two magnetic heads 10a, 10b (magnetic head 10b is hidden in FIG. 1) are disposed about 180 degrees apart on rotary disc 2. Magnetic heads 10a and 10b include head chips 11a and 11b (head chip 11b is hidden in FIG. 1) which protrude slightly beyond the periphery of rotary disc 2 and alternately describe skewed parallel paths on magnetic tape 6.

Referring now to FIG. 2, there is shown a strip of magnetic tape 6 with a plurality of skewed parallel tracks $T_a$, $T_b$ continuously repeating thereon. Tracks $T_a$, $T_b$ were recorded while magnetic tape 6 was transported in the direction of arrow B at a normal recording tape transport speed and while head chips 11a and 11b were moved in the direction indicated by arrow A diagonal to the tape transport direction B. Parallel tracks $T_a$ and $T_b$ are shown with guardbands, or unrecorded track-like spaces between them. Although guardbands, or unrecorded spaces, between recorded tracks $T_a$ and $T_b$ are not necessary to the practice of the present invention, they are included for ease of description.

During normal-speed reproduction in which magnetic tape 6 is transported at the same tape transport speed in a direction B as was used during recording, the path followed by a head chip 11a (or 11b) tends to be parallel to recorded tracks $T_a$ and $T_b$. However, as a head chip, for example, head chip 11a begins to scan a path on magnetic tape 6, there is a probability that its path may begin as shown in FIG. 2 substantially equally spaced between adjacent tracks $T_a$ and $T_b$. It is conventional in helical scan video tape recorders to employ a signal reproduced by the head chip to produce a control signal which is effective to deflect the head chip into coincidence with one of the tracks $T_a$ or $T_b$ as indicated by the forked arrow 15. As will be explained in greater detail in later paragraphs, this control function is performed by slightly "wobbling" or "dithering" the head chip 11a in a direction transverse to its path, such as indicated by double headed arrow C, by employing a sinusoidal deflection signal, and using the amplitude modulation resulting from the head chip 11a moving more and less into alignment with one of tracks $T_a$ and $T_b$ to develop a control signal which rapidly shifts the mean path of head chip 11a (or 11b) into coincidence with track $T_a$ or $T_b$.

A further control function is required when the tape transport speed during reproduction is significantly different from the tape transport speed employed during recording. For example, during still reproduction in which magnetic tape 6 is stopped while head chips 11a and 11b continue to scan magnetic tape 6, due to the lack of a component of motion in tape transport direction B, the scanning path of head chips 11a and 11b is skewed with respect to recorded tracks $T_a$ and $T_b$ as shown by a dashed path 14. The correction of skewed path 14 to coincide with recorded track $T_b$, for example, requires a sawtooth or triangular correction signal which begins with high amplitude to displace the head chip into coincidence with track $T_b$ at the beginning of scanning and decreases to approximately zero at the end of path 14. The two types of correction signals, namely the wobbling or dithering signal and the triangular signal are normally separately produced and applied to a means for displacing head chip 11a (or 11b) in the appropriate direction.

Referring now to FIG. 3, there is shown a displacement means for magnetic head 10a in which a head chip 11a is disposed at one extremity of a conventional bimorph plate 12a. The other extremity of bimorph plate 12a is affixed to a head base 13a by any convenient means such as a screw 37a. Bimorph plate 12a has the characteristic that it deflects in the direction shown by double headed arrow C in response to control signals applied thereto. Consequently, the deflection of bimorph plate 12a produces a corresponding deflection in the position of head chip 11a.

Bimorph plates, such as bimorph plates 12a (and 12b) exhibit the phenomenon of hysteresis wherein, once deflected from a neutral, or home, position by a control signal, they do not return completely to their neutral, or home, position upon removal of the control signal. Instead, they remain slightly bent or deflected in the direction in which they were bent by the control signal even after the control signal has been reduced to zero. Thus, when a video tape recorder is shut down, it is entirely possible that one of the bimorph plates, for example 12a, may remain slightly bent or deflected in the upward direction of FIG. 3, and the other bimorph plate, for example 12b (not shown), may remain slightly bent or deflected in the downward direction in FIG. 3.

Returning now to FIG. 2, when head path 14 begins equally spaced from adjacent recorded tracks $T_a$ and $T_b$ as shown, there may be an equal probability that the control voltage derived and applied in a fashion which will be later described may displace head chip 11a in either of the directions shown by forked arrow 15. Without hysteresis, the same may also be true of head chip 11b on rotary disc 2. It is thus possible that one of head chips 11 may be corrected to align with track $T_b$ and the other may be corrected to align with track $T_a$ during, for example, still reproduction. With hysteresis, the chance of head chips 11a and 11b aligning with different tracks is greatly increased. In a recording system in which each track $T_a$ or $T_b$ contains one of two interlaced fields in a television frame, a video track $T_a$ contains one field of the same frame as one of its adjacent tracks $T_b$ and, of course, contains video from a completely different frame as contained in its other adjacent track $T_b$. If the two head chips 11a and 11b follow different tracks $T_a$, $T_b$ (a phenomenon known as frame reproduction or pairing) an annoying difference may exist between the video reproduced in alternate fields. Thus, the outlines of moving objects tend to double and become indistinct.

An especially annoying phenomenon occurs if, for example, the field recorded in the left track $T_b$ (FIG. 2) is the last field in one scene and the field recorded in the adjacent track $T_a$ to the right thereof is the first field of a new scene. In that case, frame reproduction or pairing in which these two tracks are scanned in still reproduction produces completely different scenes in the two interlaced fields represented in a single picture. The interlacing of such completely different scenes produces an indecipherable picture. A similar difficulty occurs in slow motion reproduction with the additional problem that frame reproduction can invert the sequence of the reproduced fields and thus blur the reproduced picture.

Referring now to FIG. 4, there is shown a schematic view of a rotary disc 2 with heads 10a and 10b spaced 180 degrees apart thereon. Head chips 11a and 11b are rotated in the direction shown by arrow A alternately in contact with magnetic tape 6. Separate control signals on lines 38a and 38b control the deflection of bimorph plates 12a and 12b. The circuits which generate control signals on line 38a are substantially identical to those which generate the control signal on 38b. Thus, for brevity, only those circuits which produce the control signal on line 38a are described in detail.

Figure 6A:
FIGS. 6A–6F are graphs of signals to which reference will be made in describing the operation of the embodiment of the invention of FIG. 4.

A sawtooth correction signal, for correction of the skew errors in the scanning path 14 (FIG. 2) due to reproduction at a tape transport speed different from that used during recording, is generated by a sawtooth generator 32a. An external control signal may be applied through input terminal 40 to sawtooth generator 32a to control the operation thereof. A rotation sensor 30 is excited one or more times per revolution of rotary disc 2 by the motion therepast of an exciting element such as, for example, one or more magnets 39 which rotate with rotary disc 2. An output of rotation sensor 30 is applied to a pulse generator 31. Pulse generator 31, which may be a flip-flop circuit, changes its output from high to low or vice versa as shown in FIG. 6A upon each input from rotation sensor 30. In the preferred embodiment, two magnets 39 are disposed on rotary disc 2 such that they excite rotation sensor 30 as the head effectively in contact with magnetic tape 6 is changed. Thus, the pulse signal produced by pulse generator 31 has high or positive alternations corresponding to the time of contact of head chip 11b with magnetic tape 6 and low or negative alternations corresponding to the time of contact of head chip 11a with magnetic tape 6.

Figure 6B:
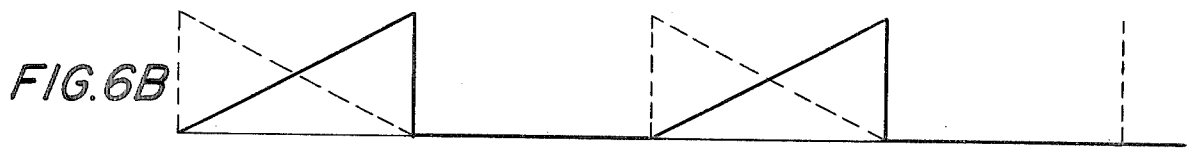

Sawtooth generator 32a generates a sawtooth output waveform which is triggered into beginning at the negative going edges of the output of pulse generator 31 (FIG. 6A) to produce, for example, a rising sawtooth waveform, as shown in solid line in FIG. 6B, or a falling sawtooth waveform, as shown in dashed line therein. Referring momentarily to FIG. 2, the rising sawtooth waveform would be employed to correct head path 14 into parallel relationship with track $T_a$ by smoothly increasing the control signal along head path 14. Alternatively, the dashed line signal in FIG. 6B may be employed to move head path 14 into parallel relationship with track $T_b$ by initially applying a large amplitude signal which smoothly decreases. The external control signal at input terminal 40 may be employed to control the slope and direction of the sawtooth waveform according to the type of reproduction being performed such as still, slow motion and fast motion. The sawtooth output of sawtooth generator 32a is applied through an adder 34a and an amplifier 35a to bimorph plate 12a.

During normal-speed reproduction, the sawtooth correction signal from sawtooth generators 32a is not required. Thus, a switch 36a may be provided to disconnect the sawtooth signal from adder 34a. Alternatively, the control signals at input terminal 40 may be employed to disable sawtooth generator 32a.

Figure 6C:
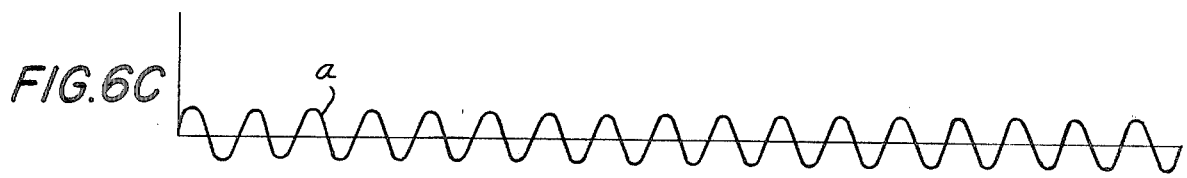
Figure 6D:
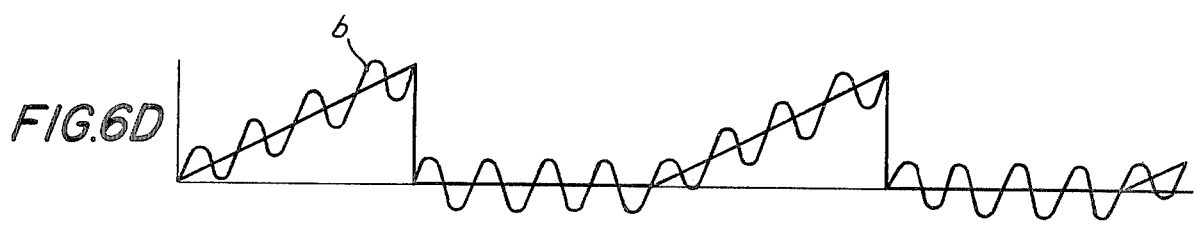

The wobbling or dithering control signal for bimorph plate 12a originates in an oscillator 20 which generates a sinusoidal signal a such as shown in FIG. 6C. The sinusoidal signal is applied to an input of adder 34a and to an input of a phase detector 18a. When sawtooth signals are also being generated, the output of adder 34a contains both a sawtooth component with a higher frequency sinusoidal component superimposed thereon as shown in FIG. 6D. The signal from adder 34a is amplified in amplifier 35a and applied to bimorph plate 12a. The sinusoidal signal applied to bimorph plate 12a wobbles or dithers head chip 11a in the cross-track direction shown by double headed arrow C in FIGS. 1 and 3. As head chip 11a moves into and out of alignment with a track, the reproduced video signal, which is typically frequency modulated, has superimposed thereon an amplitude modulation due to the wobbling. The reproduced video signal is amplified in an amplifier 16a and is envelope detected in an envelope detector 17a. The detected envelope of the reproduced signal, containing the amplitude variations due to dithering, is applied to a second input of phase detector 18a. Phase detector 18a produces an output signal whose amplitude and polarity are responsive to the phase relationship of its two inputs. The output of phase detector 18a is filtered to a low pass filter 19a and applied to the collector of series switch transistor 21a. The amplitude and polarity of the output signal from low pass filter 19a are such that, when further processed, they produce a control signal which tends to deflect bimorph plate 12a in a direction which centers the mean path of head chip 11a on a recorded track.

Figure 6E:
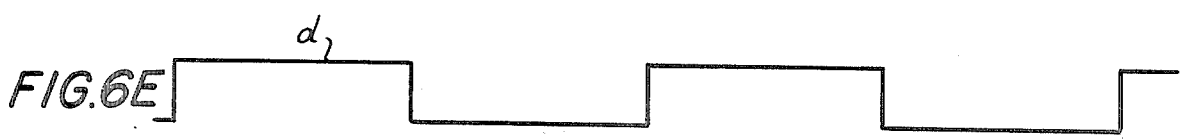
Figure 6F:
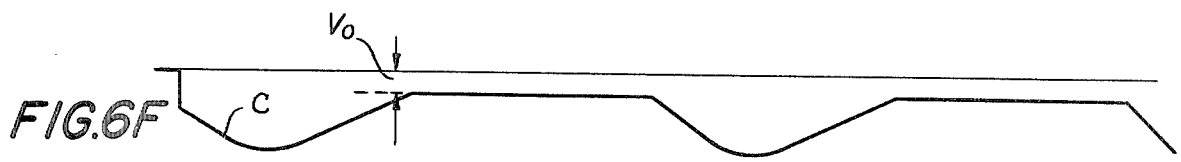

The output of pulse generator 31 is inverted in an inverter 33 to produce the signal d down in FIG. 6E which is applied to the base of series switch transistor 21. During contact of head chip 11a with magnetic tape 6, series switch transistor 21a is enabled, or made conductive, by the output d of inverter 33 and passes the output signal of low pass filter 19a from its collector to its emitter. This signal is applied through a current limiting resistor 22a to a storage capacitor 23a. The voltage c stored in storage capacitor 23a is applied to the gate of a field effect transistor 24a. As shown in FIGS. 6E and 6F, the voltage c stored in storage capacitor 23a varies during the time that the output d of inverter 33 is high or positive but remains constant at an offset voltage $V_o$ when the output d of inverter 33 is low or negative. Offset voltage $V_o$ equals the final value of voltage c at the end of scanning by head chip 11a. Thus, offset voltage $V_o$ is related to the magnitude and direction by which the home position of head chip 11a is offset from the center of the track $T_a$ or $T_b$ scanned in in the preceding field interval. A voltage proportional to the stored voltage c applied to the gate of field effect transistor 24a is developed across a resistor 41a between the source of field effect transistor 24a and ground. The voltage across resistor 41a is applied through a variable resistor 25a to one input of a differential amplifier 27. A feedback resistor 28a connected between the output and input of differential amplifier 27a, in conjunction with variable resistor 25a and resistor 41a establishes the gain of differential amplifier 27a. Variable resistor 25a may be adjusted to match the gain of differential amplifier 27a to the response of bimorph plate 12a. A reference voltage from a variable resistor 26a is applied to the positive input of differential amplifier 27a to compensate for individual bias characteristics of bimorph plate 12a and to establish its neutral or home position. The output of differential amplifier 27a, which varies in a manner similar to stored voltage c, (FIG. 6F), but which may have a different zero crossing due to the reference voltage at its positive input, is applied to an input of adder 34a where it adds a relatively slowly changing correction voltage to the relatively higher frequency sinuosoidal voltage from oscillator 20.

The offset signal available at the source of field effect transistor 24a is applied through a transfer circuit P to an input of a differential amplifier 27b which provides the control signal for bimorph plate 12b. Transfer circuit P in the embodiment of FIG. 4 contains a variable resistor 29, adjustment of which determines the portion of the offset signal from field effect transistor 24a which is applied to the input of differential amplifier 27b. In particular, a portion of the offset voltage, similar to $V_o$ (FIG. 6F), is applied to the input of differential amplifier 27b during the time that head chip 11b is in contact with the magnetic tape 6. Consequently, the stored offset voltage $V_o$ provides an initial bias voltage to bimorph plate 12b to bias it in the same direction that bimorph plate 12a is biased by offset voltage $V_o$. Thus, if head chip 11a initially begins tracking $T_b$ (FIG. 2) the offset voltage $V_o$, which was effective to displace head chip 11a from a position midway between tracks into alignment with track $T_b$ is then used to bias head chip 11b in the same direction. Thus, there will be no tendency for head chips 11a and 11b to scan different tracks even when pure probability or hysteresis in the associated bimorph plates 12a, 12b (FIG. 3) would otherwise produce this effect. The remainder of the circuit which generates the control signal for bimorph plate 12b is the same as that described in the preceding.

Since the voltage stored in capacitor 23a is effective to provide an offset voltage both to bimorph plate 12a and bimorph plate 12b, capacitor 23b with resistors 22b and 43 and series switch transistor 21b are not required and thus these components, shown in dashed box 42, may be omitted and the output of low pass filter 19b may be connected directly to the gate of field effect transistor 24b.

Figure 7:
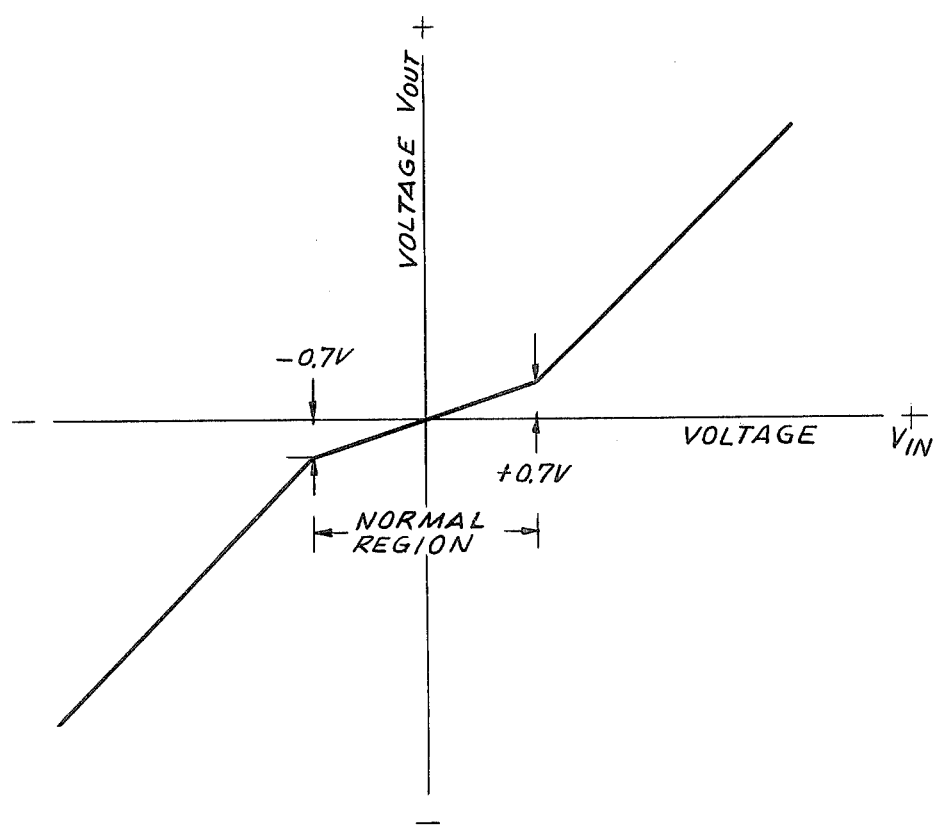
FIG. 7 is a graph to which reference will be made in describing the operation of the transfer circuit of FIG. 5.

Referring now to FIG. 5, there is shown another embodiment of transfer circuit P. Oppositely polarized diodes 39 and 40 are connected in parallel with variable resistor 29. The input-output voltage characteristic of transfer circuit P is shown in FIG. 7. In a central normal region of input voltage $V_{in}$ from about $-0.7$ volts to about $+0.7$ volts, diodes 39 and 40 function as open circuits since these voltages are less than the barrier voltages in diodes 39 and 40. Thus, the output voltage $V_{out}$ is controlled by resistor 29. Above and below the central normal region, one or the other of diodes 39 and 40 becomes forward conducting and thus acts like a closed switch which provides changes in output voltage equal to changes in input voltage. Thus, when the offset voltage $V_o$ (FIG. 6F) is outside the range of from about $-0.7$ to about $+0.7$ volts, transfer circuit P applies a proportionally greater portion of changes in offset voltage $V_o$ to the input of differential amplifier 27b than in the central normal region.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automatic tracking device operative to produce a first and a second control signal for an apparatus having first and second magnetic heads adapted to alternately scan mean paths along parallel recorded tracks on a magnetic recording medium, comprising: first and second positioning means associated respectively with said first and second magnetic heads for displacing said mean paths of said first and second magnetic heads into substantial coincidence with a single one of said parallel recorded tracks in response to said first and second control signals, respectively; first and second control signal generating means for alternately generating said first and second control signals; means in said first control signal generating means for holding a level of said control signal existing at the end of scanning by said first magnetic head; and transfer means for transferring at least part of said level to said second control signal generating means which is thereupon operative to bias said second positioning means for displacing in a direction tending to coincide said mean path of said second magnetic head with the same track scanned by said first magnetic head.

2. The automatic tracking device according to claim 1, wherein said transfer means includes a resistor.

3. The automatic tracking device according to claim 2, wherein said resistor is a variable resistor.

4. The automatic tracking device according to claim 3, wherein said transfer means further includes first and second oppositely polarized diodes in parallel with said resistor.

5. The automatic tracking device according to claim 2, wherein said transfer means further includes first and second oppositely polarized diodes in parallel with said resistor.

6. An automatic tracking device for a video tape recorder of the type having first and second magnetic heads adapted to alternately scan mean paths which are substantially parallel to previously recorded parallel tracks on a magnetic recording medium, comprising: first and second electrically displaceable head positioning means responsive respectively to first and second control signals for displacing said mean paths of said first and second magnetic heads into substantial coincidence with said parallel tracks; first control signal generating means for generating said first control signal during scanning of said first magnetic head along its said mean path; means for holding a value of said first control signal existing at the end of scanning of said first magnetic head to produce an offset signal; second control signal generating means for generating said second control signal during scanning of said second magnetic head along its said mean path; and transfer means for transferring at least part of said offset signal to said second control signal generating means, the transferred part of said offset signal being effective to bias said second electrically displaceable head positioning means in a direction which causes said mean path of said second magnetic head to coincide with the same recorded track as is scanned by said first magnetic head.

7. In a helical scan video tape apparatus of the type having first and second magnetic heads for scanning and reproducing video signals previously recorded in a plurality of parallel tracks on a magnetic recording medium, a first control system operative to coincide a mean scanning path of said first magnetic head with one of said plurality of tracks and a second control system operative to coincide a mean scanning path of said second magnetic head with one of said plurality of tracks; the improvement comprising transfer means for transferring an offset signal from said first control system to said second control system, said second control system being operative in response to said offset signal to cause coincidence of said mean scanning path of said second magnetic head with the same track as scanned by said first magnetic head.

* * * * *